United States Patent
Xie et al.

(10) Patent No.: US 9,887,802 B2
(45) Date of Patent: Feb. 6, 2018

(54) METHOD AND APPARATUS FOR CONTROLLING TRANSMISSION RATE OF PHYSICAL LAYER

(71) Applicant: Spreadtrum Communications (Shanghai) Co., Ltd., Zhangjiang, Shanghai (CN)

(72) Inventors: Xin Xie, Shanghai (CN); Ping Jiang, Shanghai (CN); Xueli Lv, Shanghai (CN); Guochu Chen, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 41 days.

(21) Appl. No.: 14/677,266

(22) Filed: Apr. 2, 2015

(65) Prior Publication Data
US 2016/0037500 A1  Feb. 4, 2016

(30) Foreign Application Priority Data
Aug. 1, 2014  (CN) .......................... 2014 1 0377504

(51) Int. Cl.
G01R 31/08  (2006.01)
H04L 1/00  (2006.01)
H04L 1/20  (2006.01)

(52) U.S. Cl.
CPC .............. H04L 1/0002 (2013.01); H04L 1/20 (2013.01)

(58) Field of Classification Search
CPC .......... H04L 1/0002; H04L 1/20; Y02B 60/31
See application file for complete search history.

(56) References Cited

U.S. PATENT DOCUMENTS

| 2008/0220724 A1* | 9/2008 | Roh ...................... H04W 8/005 455/66.1 |
| 2012/0075987 A1* | 3/2012 | Yoneyama ............ H04W 24/04 370/216 |
| 2013/0114448 A1* | 5/2013 | Koo ...................... H04W 24/00 370/252 |

(Continued)

OTHER PUBLICATIONS

"Part 11: Wireless LAN Medium Access Control (MAC) and Physical Layer (PHY) Specifications; Amendment 5: Enhancements for Higher Throughput", The Institute of Electrical and Electronics Engineers, Inc., 2009, pp. 1-536.

*Primary Examiner* — Robert Wilson
(74) *Attorney, Agent, or Firm* — Cantor Colburn LLP

(57) ABSTRACT

Method and apparatus for controlling a physical layer protocol data unit (PPDU) transmission rate of a physical layer in a first terminal are provided. The method includes: obtaining a media access control protocol data unit (MPDU) retransmission frequency of the first terminal in a first period, where the first terminal is a station or an access point in a wireless network; if the MPDU retransmission frequency is less than a frequency threshold, promoting the PPDU transmission rate in a second period; and else, suppressing the PPDU transmission rate in the second period, where the second period is following and adjacent to the first period along a time axis. The PPDU transmission rate may be adjusted adaptively according to a channel's practical transmission state, the physical layer rate may be prevented from decreasing continuously in noisy channel environment, and a throughput rate may be improved in real time.

10 Claims, 6 Drawing Sheets

(56) References Cited

U.S. PATENT DOCUMENTS

| | | | |
|---|---|---|---|
| 2013/0294379 A1* | 11/2013 | Guo | H04W 80/02 370/329 |
| 2016/0037500 A1* | 2/2016 | Xie | H04L 1/0002 370/330 |
| 2016/0037502 A1* | 2/2016 | Xie | H04W 24/00 370/330 |

* cited by examiner

METHOD AND APPARATUS FOR CONTROLLING TRANSMISSION RATE OF PHYSICAL LAYER

CROSS-REFERENCE TO RELATED APPLICATIONS

The present application claims priority to Chinese patent application No. 201410377504.5, filed on Aug. 1, 2014, and entitled "METHOD AND APPARATUS FOR CONTROLLING TRANSMISSION RATE OF PHYSICAL LAYER", and the entire disclosure of which is incorporated herein by reference.

FIELD OF THE DISCLOSURE

The present disclosure generally relates to communication technology field, and more particularly, to a method and an apparatus for controlling a transmission rate of a physical layer.

BACKGROUND OF THE DISCLOSURE

Institute of Electrical and Electronics Engineers (IEEE) 802.11 is a set of air interface specifications in wireless local area network developed for Dedicated Short Range Communication (DSRC) by IEEE Committee. In IEEE 802.11 networking environment, a transmission rate of a physical layer is generally determined based on statistical data like packet retransmission rate, packet transmission error rate or packet reception error rate.

Determining the transmission rate based on packet retransmission rate and determining the transmission rate based on packet transmission error rate basically have the similar performance. For example, a method for determining the transmission rate based on the packet retransmission rate includes: a station (STA) or an access point (AP) determining a noisy level or a physical transmission performance of a channel by repeatedly sending physical layer protocol data unit (PPDU) data packets which have different rates, and further determining whether a current packet transmission rate of the physical layer needs to be raised or decreased based on the noisy level and/or the physical transmission performance.

The method above may have following disadvantages. On one hand, Detection of the noisy level of the channel may be relatively slow. On the other hand, even when the physical transmission performance of the channel is fine, if the channel is noisy (for example, a plurality of STAs and APs exist in the network), the STAs and the APs may collide with each other to result in noisy environment, which may cause an increased packet retransmission rate and a decreased physical layer rate of the STAs and APs transmitting PPDU. With the decreased physical layer rate, the STAs and APs may take more time to transmit packets. As a result, packets of the STAs and APs may be more prone to collide with each other. In this way, the physical layer rate of the STAs and APs transmitting PPDU is decreased continuously and reaches a minimum rate finally, and the packet retransmission rate may become greater, which leads to a zero throughput rate of the STAs and APs, and further leads to an interruption of communication.

A method for determining the transmission rate based on the packet reception error rate includes determining a noisy level or a physical transmission performance of a channel based on the packet reception error rate, which is an indirect estimation. The packet reception error rate in the method cannot directly reflect the physical transmission performance of the STAs and APs transmitting packets, the noisy level of the channel, and whether the channel is busy or clear. The packet reception error rate also cannot determine what influence the PPDU transmitted by the STAs and APs in different positions may cause to the reception performance of the STAs and APs. Thus, a throughput rate of the STAs or APs cannot be ensured.

From above, in existing techniques, the physical layer rate in the noisy channel environment may be decreased continuously and a throughput rate of the STAs or APs cannot be ensured effectively.

SUMMARY

In one embodiment of the present disclosure, a method for controlling a physical layer protocol data unit (PPDU) transmission rate of a physical layer in a first terminal is provided. The method includes: obtaining a media access control protocol data unit (MPDU) retransmission frequency of the first terminal in a first period, where the first terminal is a station (STA) or an access point (AP) in a wireless network; if the MPDU retransmission frequency is less than a frequency threshold, increasing the PPDU transmission rate of the physical layer in the first terminal in a second period; and if the MPDU retransmission frequency is greater than or equal to the frequency threshold, decreasing the PPDU transmission rate of the physical layer in the first terminal in the second period, where the second period is following and adjacent to the first period along a time axis. In embodiments of the present disclosure, the MPDU retransmission frequency of the first terminal represents the retransmission frequency of the first terminal transmitting MPDUs.

Optionally, obtaining the MPDU retransmission frequency may include: obtaining a first number, where the first number represents the number of MPDUs transmitted by the first terminal in the first period; obtaining a second number, where the second number represents the number of MPDUs retransmitted by the first terminal in the first period; if the first number is greater than or equal to a first threshold, determining the MPDU retransmission frequency based on Equation (1), $$RR = \frac{Tx\_Retry\_Cnt}{Tx\_Total\_Cnt} \quad (1)$$

where RR is the retransmission frequency, Tx_Total_Cnt is the first number, and Tx_Retry_Cnt is the second number; and if the first number is less than the first threshold, determining the retransmission frequency to be zero.

Optionally, the first threshold may be within a range from 10 to 50, and the first period and the second period may be within a range from 100 ms to 500 ms.

Optionally, the frequency threshold may increase with the increment of a noisy level of a channel.

Optionally, the noisy level of the channel may decrease with the increment of a first ratio, where the first ratio is obtained based on Equation (2), $$A = C/B \quad (2)$$

where A represents the first ratio, B represents the number of a first set of data including all first data received by the first terminal in the first period, C represents a second set of data including a portion of the first data received by the first terminal in the first period, where each media access control (MAC) target address of the second set of data is the first terminal, where the first data include aggregation frames and non-aggregation frames.

Optionally, the noisy level of the channel may be determined based on a norm of the noisy level of the channel, and the norm of the noisy level of the channel is determined by: obtaining a third number, where the third number represents the number of PPDUs received by the first terminal in the first period; obtaining a fourth number, where the fourth number represents the number of Acknowledgement (ACK) frames or block ACK frames received by the first terminal in the first period; obtaining a fifth number, where the fifth number represents the number of the first data received by the first terminal in the first period, which are not ACK frames or block ACK frames and whose MAC target addresses are the first terminal; and if the difference between the third number and the fourth number is greater than or equal to a second threshold, determining the norm of the noisy level of the channel based on Equation (3), $$CCA\_Freq = 1 - \frac{Rx\_MPDU\_Cnt}{Rx\_PPDU\_Cnt - Rx\_ACK\_Cnt} \quad (3)$$

where CCA_Freq is the norm of the noisy level of the channel, Rx_PPDU_Cnt is the third number, Rx_ACK_Cnt is the fourth number, and Rx_MPDU_Cnt is the fifth number.

Optionally, the method may further include: if the difference between the third number and the fourth number is less than the second threshold, determining the norm of the noisy level of the channel to be zero.

Optionally, the method may further include: determining the frequency threshold corresponding to the norm of the noisy level of the channel based on a first mapping relation.

Optionally, the second threshold may be within a range from 1 to 10.

Optionally, increasing the PPDU transmission rate of the physical layer in the first terminal in the second period may include: if the PPDU transmission rate of the physical layer in the second period reaches a rate threshold, remaining the PPDU transmission rate of the physical layer in the second period.

Optionally, the rate threshold may be related to first parameters, where the first parameters include powers or signal strength indication values of PPDUs received by the first terminal in the first period.

Optionally, the rate threshold may be obtained by: obtaining an average value of the first parameters received by the first terminal in the first period; obtaining a rate corresponding to the average value according to a second mapping relation; and determining the rate as the rate threshold, where the second mapping relation is determined based on a relation between sensitivity of a physical layer rate stipulated in the Institute of Electrical and Electronics Engineers (IEEE) 802.11 standard and the first parameters.

In one embodiment of the present disclosure, an apparatus for controlling a PPDU transmission rate of a physical layer in a first terminal is provided. The apparatus includes: an obtaining unit, configured to obtain a MPDU retransmission frequency of the first terminal in a first period, where the first terminal is a STA or an AP in a wireless network; and a controlling unit, configured to: if the MPDU retransmission frequency is less than a frequency threshold, increase the PPDU transmission rate of the physical layer in the first terminal in a second period; and if the MPDU retransmission frequency is greater than or equal to the frequency threshold, decrease the PPDU transmission rate of the physical layer in the first terminal in the second period, where the second period is following and adjacent to the first period along a time axis.

In embodiments of the present disclosure, the MPDU retransmission frequency of the first terminal in the first period is obtained. Based on the obtained MPDU retransmission frequency and the relation between the MPDU retransmission frequency and the predetermined frequency threshold, the PPDU transmission rate of the physical layer in the first terminal in the second period is increased or decreased adaptively. In this way, the PPDU transmission rate of the physical layer may be adjusted adaptively and may not decrease continuously in the noisy channel environment, and the throughput rate may be improved in real time.

By obtaining the norm of the noisy level of the channel, the noisy level of the channel may be detected effectively and the physical transmission performance of the channel may be reflected. Further, the frequency threshold adapted for the current channel environment may be determined, and the transmission rate of the physical layer may be increased or decreased based on the frequency threshold, thus, the throughput rate may be improved in real time.

DETAILED DESCRIPTION OF THE DISCLOSURE

In existing techniques, due to a noisy channel environment, a physical layer rate may decrease continuously and sometimes, an interruption of communication may occur, thus, a throughput rate of STAs or APs cannot be ensured.

In an embodiment, a method for controlling a PPDU transmission rate of a physical layer in a first terminal is provided.

IEEE 802.11 wireless network environment is complicated, thus, data packets are prone to collide with each other. In the network containing a plurality of STAs and APs, the collision among the data packets may result in noisy channel environment. When the channel is quite noisy, the collision among the data packets transmitted by the STAs and APs may further cause an increased retransmission rate, which may lead to a decreased throughput rate. Therefore, to improve the throughput rate, appropriate packet transmission rates of the physical layer may be determined in real time.

The method provided in embodiments of the present disclosure may detect a practical transmission performance rapidly. By adjusting a data packet transmission rate of a physical layer adaptively, a throughput rate may be improved in real time.

Figure 1:
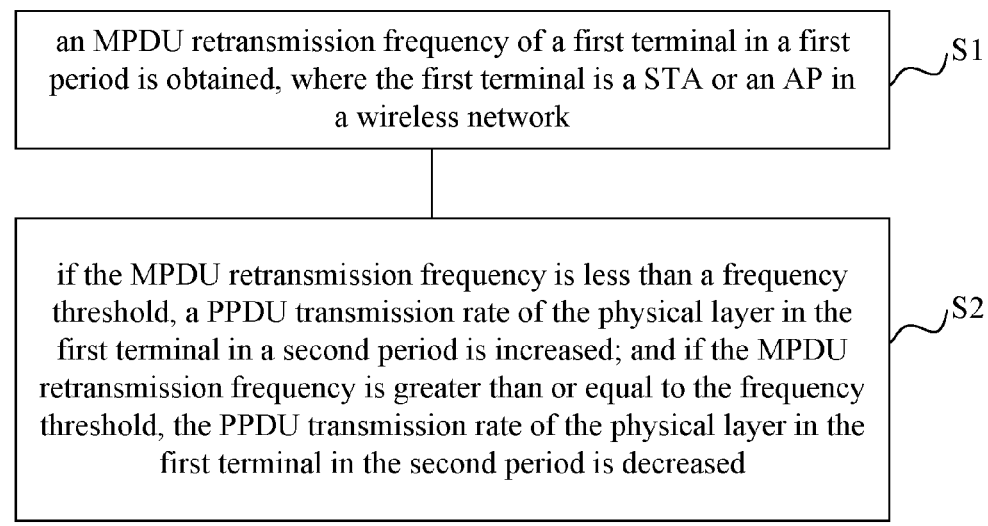
FIG. 1 schematically illustrates a flow chart of a method for controlling a transmission rate of a physical layer according to an embodiment of the disclosure.

FIG. 1 schematically illustrates a flow chart of a method for controlling a transmission rate of a physical layer according to an embodiment of the disclosure. Referring to FIG. 1, in S1, an MPDU retransmission frequency of a first terminal in a first period is obtained, where the first terminal is a STA or an AP in a wireless network.

To realize real-time adjustment to a data packet transmission rate of the physical layer according to a practical transmission performance of a channel, a time range may be divided into a plurality of time interval sequences, i.e., a plurality of time periods. Based on statistical data of the STAs or APs transmitting data packets in a current time period, the practical transmission performance of the channel in the current time period may be determined, and the data packet transmission rate of the physical layer of the STAs or APs may be adjusted accordingly in real time in a time period which is following and adjacent to the current time period.

Hereinafter, a first period is used to represent the current time period the STAs or APs stay, and a second period is used to represent the time period which is following and adjacent to the current time period.

In some embodiments, the statistical data of the STAs or APs transmitting data packets in the current time period may include the MPDU retransmission frequency of the first terminal in the first period.

In S2, if the MPDU retransmission frequency is less than a frequency threshold, a PPDU transmission rate of the physical layer in the first terminal in a second period is increased; and if the MPDU retransmission frequency is greater than or equal to the frequency threshold, the PPDU transmission rate of the physical layer in the first terminal in the second period is decreased.

In some embodiments, the frequency threshold may be pre-determined.

If the MPDU retransmission frequency is greater than or equal to the frequency threshold, the current retransmission frequency is relatively great, a data transmission rate of the physical layer may be decreased; else, the data transmission rate of the physical layer may be increased.

In some embodiments, the frequency threshold may be determined based on a noisy level of the channel. In some embodiments, the frequency threshold may increase with the increment of the noisy level of the channel.

In embodiments of the present disclosure, the current physical transmission performance may be detected effectively, so that the data packet transmission rate of the physical layer can be increased or decreased adaptively in real time. Therefore, the physical layer rate may not decrease continuously in a noisy channel environment, and a throughput rate may be optimized in real time.

In order to clarify the objects, characteristics and advantages of the disclosure, embodiments of present disclosure will be described in detail in conjunction with accompanying drawings.

In some embodiments, the noisy level of the channel in the first time period may be determined, and the frequency threshold may be further determined based on the noisy level of the channel. According to a relation between the MPDU retransmission frequency and the frequency threshold, whether the PPDU transmission rate of the physical layer in the first terminal in the second period is increased or decreased may be determined.

In some embodiments, a time may be divided into statistical time interval sequences with an interval of T. A current time interval with the length of T is the first time period, and a time interval which is following and adjacent to the current time interval is the second time period. In the current time period, i.e., the first time period, data related to transmission by the first terminal may be counted and calculated, and the PPDU transmission rate of the physical layer may be adjusted according to the related data.

To adjust the PPDU transmission rate of the physical layer in the following and adjacent time period based on the statistical data of the current time period in real time, the time interval T may not be set too long. In some embodiments, the time interval T may be within a range from 100 ms to 500 ms, that is, the first period and the second period may be within a range from 100 ms to 500 ms. In some embodiments, the first period and the second period may be determined further based on practical experiment data, a channel state, and practical requirements. In embodiments of the present disclosure, the first period and the second period may be not limited.

Figure 2:
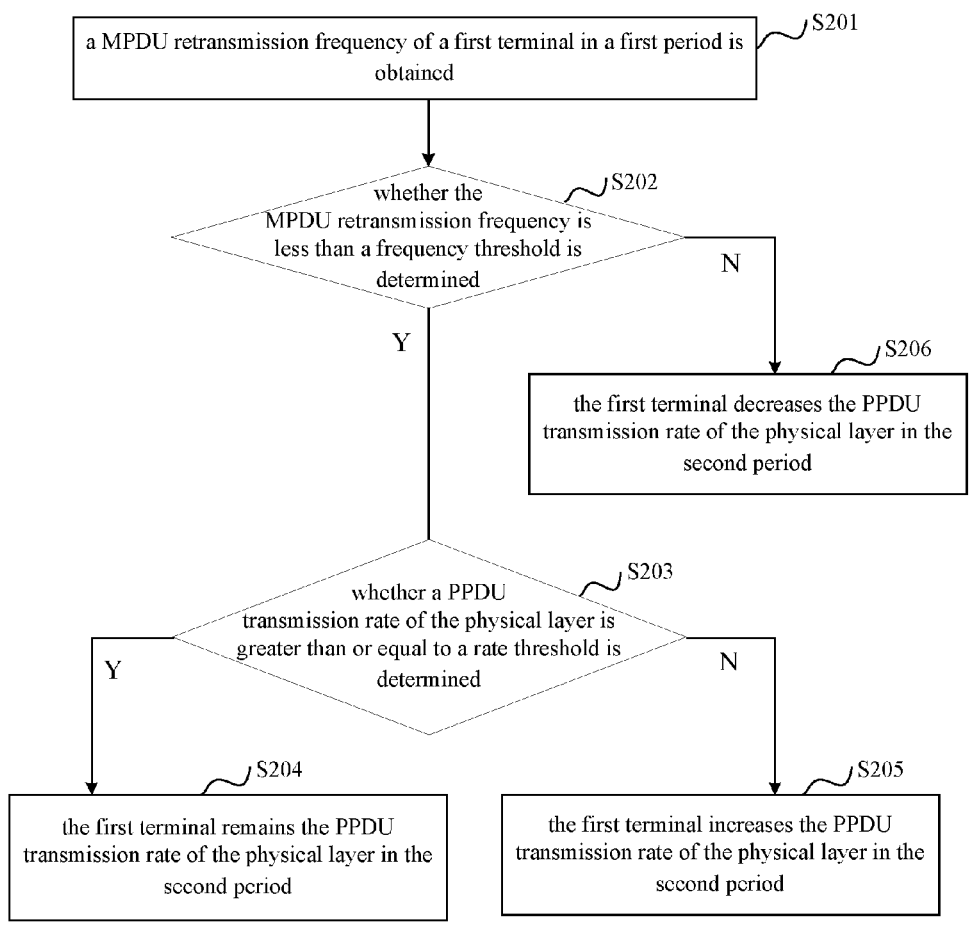
FIG. 2 schematically illustrates a flow chart of a method for controlling a transmission rate of a physical layer according to an embodiment of the disclosure.

FIG. 2 schematically illustrates a flow chart of a method for controlling a transmission rate of a physical layer according to an embodiment of the disclosure.

Referring to FIG. 2, in S201, a MPDU retransmission frequency of a first terminal in a first period is obtained.

To obtain the MPDU retransmission frequency, in some embodiments, two timers may be set, where the first timer is used to count the number of MPDUs transmitted by the first terminal in the first period, and the second timer is used to count the number of MPDUs retransmitted by the first terminal in the first period.

Figure 3:
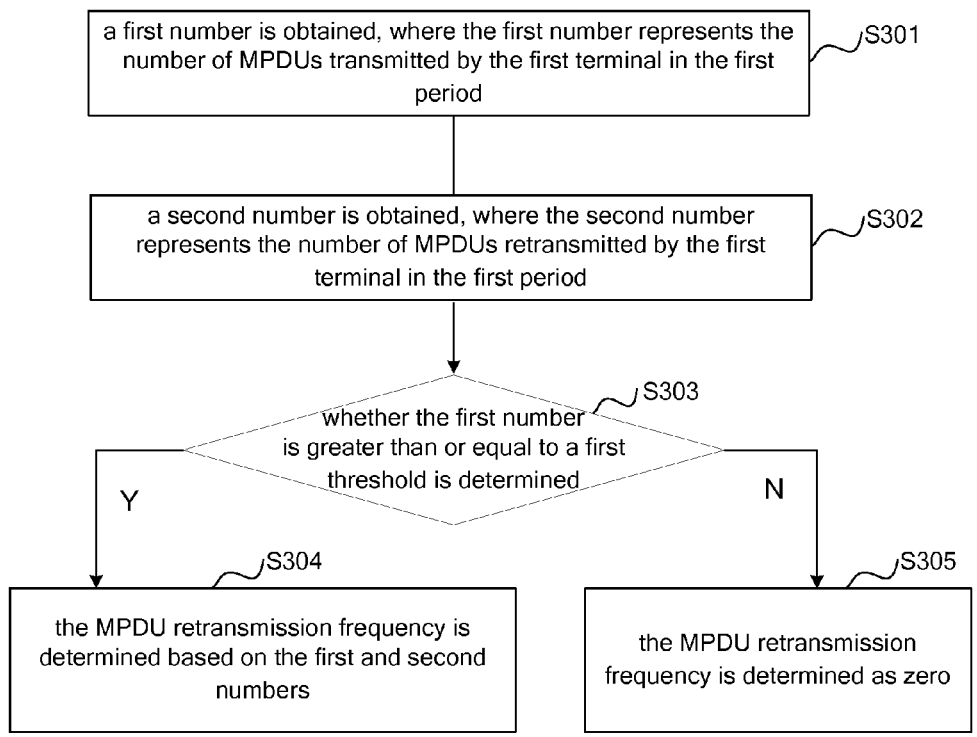
FIG. 3 schematically illustrates a flow chart of a process for obtaining a retransmission frequency according to an embodiment of the disclosure.

FIG. 3 schematically illustrates a flow chart of a process for obtaining the MPDU retransmission frequency according to an embodiment of the disclosure.

Referring to FIG. 3, statistical data related to the MPDU retransmission frequency may be obtained by performing S301 and S302.

In S301, a first number is obtained, where the first number represents the number of MPDUs transmitted by the first terminal in the first period.

The first number is counted by the first timer and represented by Tx_Total_Cnt.

In S302, a second number is obtained, where the second number represents the number of MPDUs retransmitted by the first terminal in the first period.

The second number is counted by the second timer and represented by Tx_Retry_Cnt.

Based on the statistical data obtained in S301 and S302, the MPDU retransmission frequency may be obtained.

In S303, whether the first number is greater than or equal to a first threshold is determined.

In some embodiments, the first threshold may be predetermined based on a practical state of the channel or experiment data.

The first threshold may be set based on following consideration. If the first number is too small, i.e., the MPDUs transmitted by the first terminal in the first period is too few, there is no sense in counting the MPDU retransmission frequency RR. Only when the MPDUs transmitted by the first terminal in the first period reach a certain number, the MPDU retransmission frequency may reflect the state of the channel actually.

In some embodiments, if the first and second periods are within a range from 100 ms to 500 ms, the first threshold may be set to be within a range from 10 to 50 according to related experiment data.

In some embodiments, the first threshold may be set according to practical experiment data and a state of the channel, and is not limited here.

If the first number is greater than or equal to the first threshold, S304 is performed, else, S305 is performed.

In S304, the MPDU retransmission frequency is determined based on the first and second numbers.

If the first number is greater than or equal to the first threshold, the transmission frequency RR may be obtained based on Equation (1), $$RR = \frac{Tx\_Retry\_Cnt}{Tx\_Total\_Cnt} \quad (1)$$

where RR is the retransmission frequency, Tx_Total_Cnt is the first number, and Tx_Retry_Cnt is the second number.

In S305, the MPDU retransmission frequency is determined as zero.

If the first number is less than the first threshold, the MPDU transmission frequency RR may be determined as zero.

In some embodiments, the MPDU retransmission frequency may be obtained using other methods, which is not limited here.

In S202, whether the MPDU retransmission frequency is less than a frequency threshold is determined.

The frequency threshold may be pre-determined.

In some embodiments, a relation between a noisy level of the channel and the frequency threshold may be pre-determined. When the noisy level is relatively great, the MPDU retransmission frequency is great, and the frequency threshold should be set relatively great. That is, the frequency threshold may increase with the increment of the noisy level of the channel.

In some embodiments, the noisy level of the channel may be determined based on the number of first data received by the first terminal in the first period whose MAC target address is the first terminal.

The first data may include aggregation frames and non-aggregation frames. The aggregation frames may be selected from A-MPDUs, A-MAC Service Data Units (MSDUs) or combined aggregation frames. The combined aggregation frames may be multi-level aggregation frames consisting of MPDUs and MSDUs. The non-aggregation frames may be MPDUs. The A-MPDU is an aggregation frame aggregated by multiple MPDUs, and the A-MSDU is an aggregation frame aggregated by multiple MSDUs. The combined aggregation frame is a combination of aggregation frames aggregated by MPDUs and aggregation frames aggregated by MSDUs. For example, multiple MSDUs consist a MPDU, and multiple MPDUs further consist an aggregation frame, where the aggregation frame is a multi-level aggregation frame consisting of MSDUs and MPDUs.

In some embodiments, the noisy level of the channel may decrease with the increment of a first ratio, where the first ratio is obtained based on Equation (2), $$A = C/B \quad (2)$$

where A represents the first ratio, B represents the number of a first set of data including all first data received by the first terminal in the first period, C represents a second set of data including a portion of the first data received by the first terminal in the first period, where each MAC target address of the second set of data is the first terminal. The greater the first ratio is, the less the noisy level of the channel is; and vice versa.

Determination of the noisy level of the channel is described in combination of specific formulas. In some embodiments, the noisy level of the channel may be determined based on a norm of the noisy level of the channel.

Figure 4:
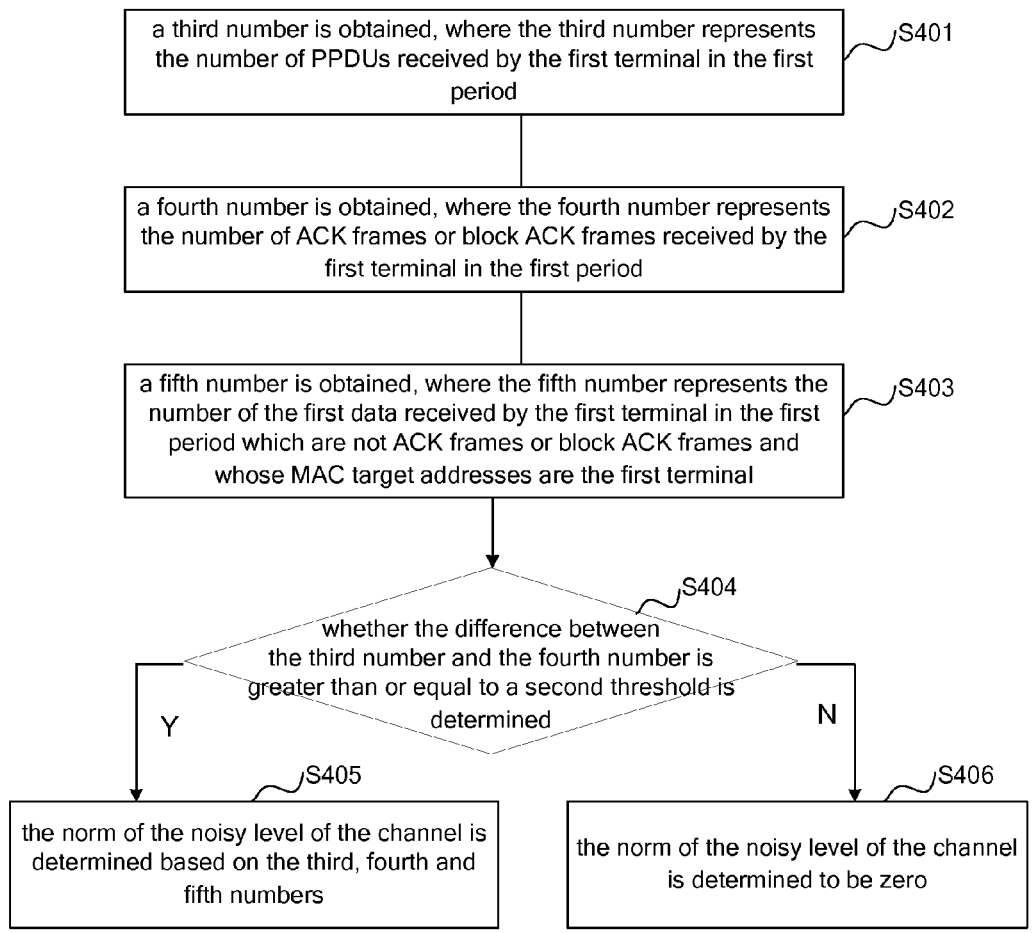
FIG. 4 schematically illustrates a flow chart of a method for obtaining a norm of a noisy level according to an embodiment of the disclosure.

FIG. 4 schematically illustrates a flow chart of a method for determining a norm of a noisy level of a channel according to an embodiment of the disclosure. Referring to FIG. 4, during the determination of the noisy level of the channel, S401 to S404 may be performed to obtain related statistical data.

In S401, a third number is obtained, where the third number represents the number of PPDUs received by the first terminal in the first period.

The third number is represented by Rx_PPDU_Cnt.

In S402, a fourth number is obtained, where the fourth number represents the number of ACK frames or block ACK frames received by the first terminal in the first period.

The fourth number is represented by Rx_ACK_Cnt.

ACK or block ACK is a message acknowledgement mechanism which is used to ensure the transmission reliability of air interface data.

During a message transmission process, to each IEEE802.11 message transmitted by a sending terminal (for example, the first terminal), a receiving terminal, after receiving it, needs to perform an ACK or block ACK acknowledgement. If receiving the ACK or block ACK acknowledgement, the sending terminal may determine that the message is successfully transmitted and send a next frame; else, the sending terminal may retransmit the message.

In S403, a fifth number is obtained, where the fifth number represents the number of the first data received by the first terminal in the first period which are not ACK frames or block ACK frames and whose MAC target addresses are the first terminal.

The fifth number is represented by Rx_MPDU_Cnt.

In some embodiments, the first data are aggregation frames, and the fifth number represents the number of the aggregation frames received by the first terminal in the first period which are not ACK frames or block ACK frames and whose MAC target addresses are the first terminal. In some embodiments, the first data are non-aggregation frames, and the fifth number represents the number of the non-aggregation frames received by the first terminal in the first period which are not ACK frames or block ACK frames and whose MAC target addresses are the first terminal.

The fifth number may be obtained by using a filtering method based on frame types. For example, frames related to ACK or block ACK acknowledgement mechanisms may be filtered out, and a portion of the remained first data whose MAC target address is the first terminal is counted to obtain the fifth number.

The first terminal may obtain the first data based on PPDUs received from demodulation in the physical layer and upload the first data to an MAC layer. The first data whose MAC target addresses are the first terminal may be counted.

Based on the data obtained from S401 to S403, the norm of the noisy level of the channel may be obtained.

It should be noted that, S401 to S403 can be performed in any order to obtain the required statistical data.

After S401, S402 and S403, S404 is performed. In S404, whether the difference between the third number and the fourth number is greater than or equal to a second threshold is determined.

The second threshold may be determined based on experience data, experiment data and so on.

In some embodiments, the first and second periods are within the range from 100 ms to 500 ms. Based on experiment data, the second threshold may be set to be within a range from 1 to 10. In some embodiments, the second threshold may be determined based on practical experiment data and a state of the channel, and is not limited here.

If the difference between the third number and the fourth number is greater than or equal to the second threshold, S405 is performed; else, S406 is performed.

In S405, the norm of the noisy level of the channel is determined based on the third, fourth and fifth numbers according to Equation (3), $$CCA\_Freq = 1 - \frac{Rx\_MPDU\_Cnt}{Rx\_PPDU\_Cnt - Rx\_ACK\_Cnt} \quad (3)$$

where CCA_Freq is the norm of the noisy level of the channel, Rx_PPDU_Cnt is the third number, Rx_ACK_Cnt is the fourth number, and Rx_MPDU_Cnt is the fifth number.

In S406, the norm of the noisy level of the channel is determined to be zero.

As the third number is the number of PPDUs received by the first terminal in the first period, and the fourth number is the number of ACK frames or block ACK frames received by the first terminal in the first period, the difference between the third number and the fourth number is the number of PPDUs received by the first terminal in the first period which are not ACK frames or block ACK frames. If the difference therebetween is relatively small, it indicates that the PPDUs received by the first terminal in the first period are almost data packets obtained by ACK or block ACK message acknowledgement mechanisms, and the noisy level of the channel has little interference on the statistic result. Under the message acknowledgement mechanisms, the channel is occupied by the first terminal, thus, the noisy level of the channel may be regarded as zero. That is, if the difference between the third number and the fourth number is less than the second threshold, the norm of the noisy level of the channel may be zero.

Based on S401 to S406, the norm of the noisy level of the channel in the first period may be obtained.

After the norm of the noisy level of the channel is determined, the frequency threshold corresponding to the norm of the noisy level of the channel may be determined based on a first mapping relation between the norm of the noisy level and the frequency level.

The first mapping relation may be pre-determined based on experiment data.

Still referring to FIG. 2, if it is determined that the MPDU retransmission frequency is less than the frequency threshold in S202, S203 is performed; else, S206 is performed.

If the MPDU retransmission frequency is determined to be less than the frequency threshold, it indicates that the current transmission performance is relatively well, and the PPDU transmission rate of the physical layer in the first terminal in a following and adjacent period (the second period) may be increased.

In S203, whether a PPDU transmission rate of the physical layer is greater than or equal to a rate threshold is determined.

As a practical transmission situation of the channel is generally complicated, different practical transmission situations of the channel may correspond to different maximum rate limitations of the physical layer transmitting PPDUs. When the maximum rate limitation is exceeded, a throughput rate of the channel may decrease.

Therefore, in some embodiments, the maximum rate may be pre-determined, that is, the rate threshold is pre-determined.

The rate threshold may be determined based on first parameters, where the first parameters are power or received signal strength indication (RSSI) values of the PPDUs received by the first terminal in the first period.

In some embodiments, the rate threshold of the channel in the second period is determined based on the power of the PPDUs received by the first terminal in the first period.

Assume that when the PPDUs received in the first period which are transmitted by APs or STAs connected with the first terminal reach an antenna interface of the first terminal, there are N receiving powers which are represented by Pwr(i), where i is within a range from 1 to N.

An average value Pwr of the receiving powers is obtained based on Equation (4), $$Pwr = \frac{1}{N} \sum_{i=1}^{N} Pwr(i) \quad (4)$$

After obtaining the average value Pwr of the receiving powers, based on a pre-determined second mapping relation between receiving powers and rate thresholds, the rate threshold corresponding to the average value Pwr of the receiving powers is determined.

The second mapping relation may be determined based on detailed experiment data and a relation between sensitivity of a physical layer rate stipulated in the IEEE 802.11 standard and the receiving powers.

If it is determined that the PPDU transmission rate of the physical layer is greater than or equal to the rate threshold in S203, it indicates that the PPDU transmission rate of the physical layer in the second period has reached the maximum transmission rate allowed by the channel, and it is not suitable to increase the PPDU transmission rate.

In some embodiments, if it is determined that the PPDU transmission rate of the physical layer is greater than or equal to the rate threshold, S204 is performed; else, S205 is performed.

In S204, the first terminal remains the PPDU transmission rate of the physical layer in the second period.

That is, in the second period, the first terminal still transmit the PPDUs with the rate used in the first period, In S205, the first terminal increases the PPDU transmission rate of the physical layer in the second period.

If it is determined that the PPDU transmission rate of the physical layer is less than the rate threshold, it indicates that there is still space for the first terminal to increase the PPDU transmission rate of the physical layer. Therefore, the PPDU transmission rate of the physical layer may be increased in the second period.

In some embodiments, the PPDU transmission rate of the physical layer may be increased by an extent which is determined based on the retransmission frequency, the frequency threshold and a practical state of the channel.

In S206, the first terminal decreases the PPDU transmission rate of the physical layer in the second period.

If it is determined that the MPDU retransmission frequency is greater than or equal to the frequency threshold in S202, to obtain better transmission performance, the PPDU transmission rate of the physical layer may be decreased in the second period.

In some embodiments, the PPDU transmission rate of the physical layer may be decreased by an extent which is determined based on the MPDU retransmission frequency, the frequency threshold and the practical state of the channel.

Based on S201 to S206, the PPDU transmission rate of the physical layer may be increased or decreased in the second period according to the statistical data obtained by the first terminal in the first period.

In above embodiments, based on the average value of the receiving powers received by the first terminal in the first period, and further based on the relation between the receiving powers and the rate thresholds, the data transmission rate threshold of the physical layer which corresponds to the average value of the receiving powers is obtained. It should be noted that, in some embodiments, an average value of the RSSI values received by the first terminal in the first period may be obtained and further the data transmission rate threshold corresponding to the average value of the RSSI values may be determined based on a relation between the RSSI values and the rate thresholds.

It should be noted that, in above embodiments, the current time period is considered as the first period, and a time period which is following and adjacent to the first period is considered as the second period. Based on the statistical data in the current period, the physical layer rate in the following and adjacent period may be adjusted adaptively. To any time interval along the time axis, the physical layer rate therein can be adjusted based on related statistical data in a previous time interval. Therefore, the physical layer rate in each time period can be adjusted flexibly to improve the throughput rate in real time.

It should be noted that, in some embodiments, statistical data at the head of a time period may be obtained and used for adjustment in the back-end of the time period, which is also within the scope of the present disclosure.

In above embodiments, by obtaining the norm of the noisy level of the channel, the noisy level of the channel may be detected, and the physical transmission performance of the channel may be reflected actually. The physical transmission performance of the channel may decrease with the increment of the noisy level of the channel.

In above embodiments, based on the receiving powers received by the first terminal in the first period, the maximum physical layer transmission rate the first terminal can support in the second period may be determined. Further combining with the norm of the noisy level of the channel and the MPDU retransmission frequency, the PPDU transmission rate of the physical layer in the first terminal in the second period may be adjusted. In the methods, the physical transmission performance of the channel may be determined effectively, and the noisy level of the channel (whether the channel is busy or clear) may be determined. Therefore, the PPDU transmission rate of the physical layer may be adjusted adaptively in real time, which may prevent the PPDU transmission rate from decreasing continuously in a noisy channel, and improve the throughput rate in real time.

Accordingly, in an embodiment, an apparatus for controlling a transmission rate of a physical layer is provided.

Figure 5:
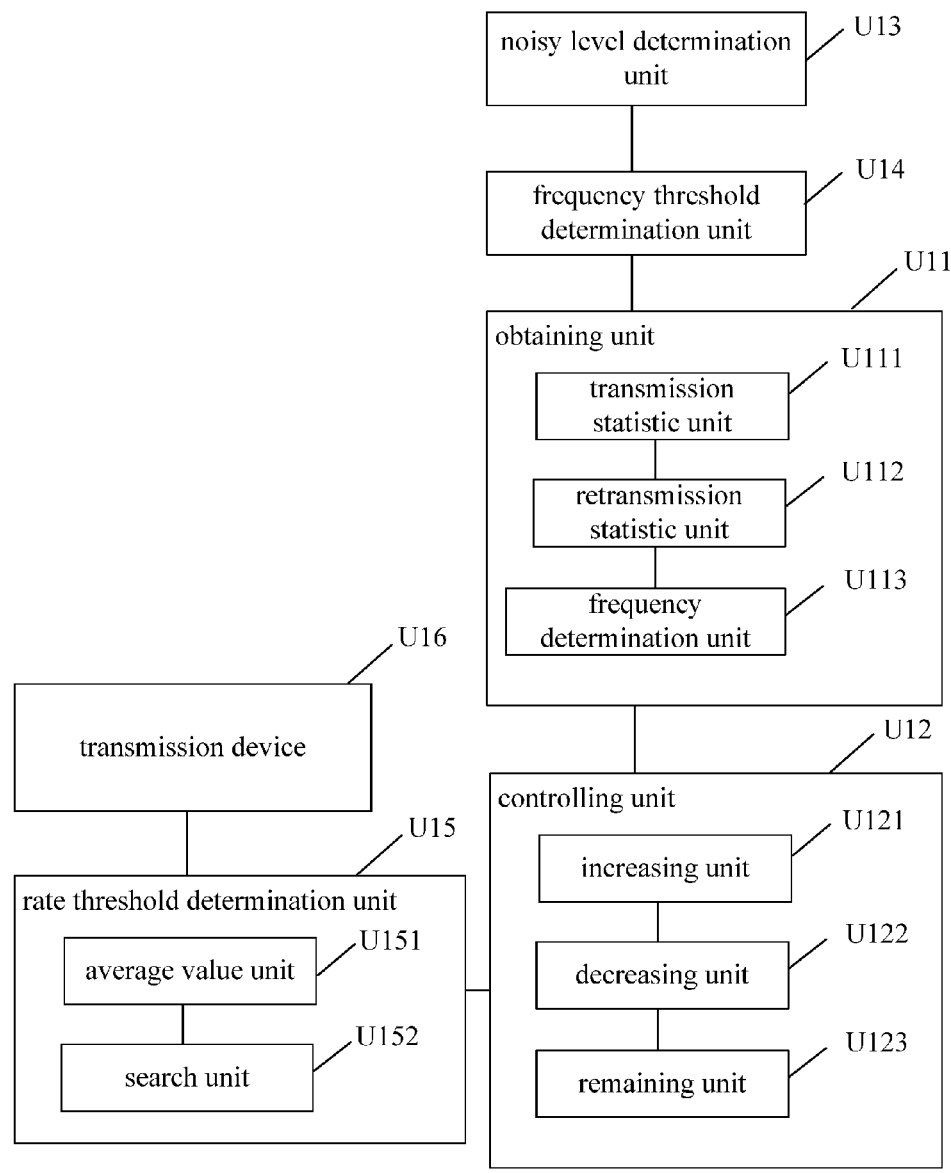
FIG. 5 schematically illustrates a structural diagram of an apparatus for controlling a transmission rate of a physical layer according to an embodiment of the disclosure.

FIG. 5 schematically illustrates a structural diagram of the apparatus for controlling the transmission rate of the physical layer according to an embodiment of the disclosure. Referring to FIG. 5, the apparatus includes an obtaining unit U11, a controlling unit U12 and a transmission unit U16.

The obtaining unit U11 may be configured to obtain a MPDU retransmission frequency of a first terminal in a first period, where the first terminal is a STA or an AP in a wireless network.

The controlling unit U12 may be configured to: if the MPDU retransmission frequency is less than a frequency threshold, increase a PPDU transmission rate of the physical layer in the first terminal in a second period; and if the MPDU retransmission frequency is greater than or equal to the frequency threshold, decrease the PPDU transmission rate of the physical layer in the first terminal in the second period, where the second period is following and adjacent to the first period along a time axis.

The transmission unit U16 may be configured to transmit PPDUs with the increased PPDU transmission rate or the decreased PPDU transmission rate in the second period.

The obtaining unit U11 may include a transmission statistic unit U111, a retransmission statistic unit U112 and a frequency determination unit U113.

The transmission statistic unit U111 may be configured to: obtain a first number, where the first number represents the number of MPDUs transmitted by the first terminal in the first period. The retransmission statistic unit U112 may be configured to: obtain a second number, where the second number represents the number of MPDUs retransmitted by the first terminal in the first period. The frequency determination unit U113 may be configured to: if the first number is greater than or equal to a first threshold, determine the MPDU retransmission frequency based on Equation (1); and if the first number is less than the first threshold, determine the MPDU retransmission frequency to be zero, $$RR = \frac{Tx\_Retry\_Cnt}{Tx\_Total\_Cnt} \qquad (1)$$

where RR is the retransmission frequency, Tx_Total_Cnt is the first number, and Tx_Retry_Cnt is the second number.

To control the PPDU transmission rate of the physical layer in the second period based on the MPDU retransmission frequency, a frequency threshold may be determined for the MPDU retransmission frequency. The frequency threshold may increase with the increment of a noisy level of a channel.

In some embodiments, the noisy level of the channel may decrease with the increment of a first ratio, where the first ratio is obtained based on Equation (2), $$A = C/B \qquad (2)$$

where A represents the first ratio, B represents the number of a first set of data including all first data received by the first terminal in the first period, C represents a second set of data including a portion of the first data received by the first terminal in the first period, where each media access control (MAC) target address of the second set of data is the first terminal, where the first data include aggregation frames and non-aggregation frames.

In some embodiments, the noisy level of the channel may be determined based on a norm of the noisy level of the channel.

In some embodiments, the noisy level of the channel may be determined based on the norm of the noisy level of the channel by a noisy level determination unit U13 in the apparatus.

Figure 6:
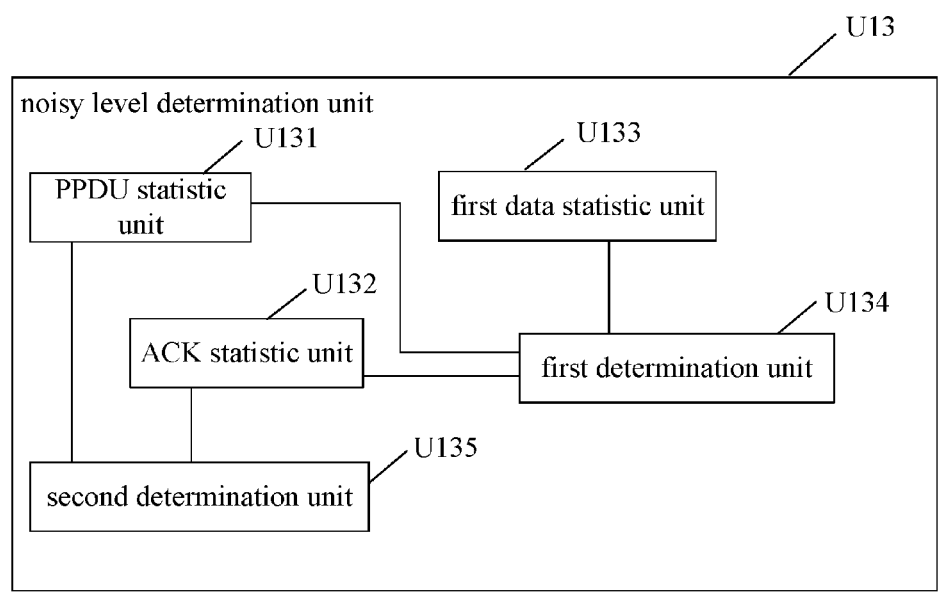
FIG. 6 schematically illustrates a structural diagram of a noisy level determination unit according to an embodiment of the disclosure.

FIG. 6 schematically illustrates a structural diagram of the noisy level determination unit U13 according to an embodiment of the disclosure. Referring to FIG. 6, the noisy level determination unit U13 includes a PPDU statistic unit U131, an ACK statistic unit U132, a first data statistic unit U133 and a first determination unit U134.

The PPDU statistic unit U131 may be configured to obtain a third number, where the third number represents the number of PPDUs received by the first terminal in the first period.

The ACK statistic unit U132 may be configured to obtain a fourth number, where the fourth number represents the number of ACKs or BLOCK_ACKs received by the first terminal in the first period.

The first data statistic unit U133 may be configured to obtain a fifth number, where the fifth number is the number of the first data received by the first terminal in the first period which are not ACK frames or block ACK frames and whose MAC target addresses are the first terminal.

The first determination unit U134 may be configured to: if the difference between the third number and the fourth number is greater than or equal to a second threshold, determine the norm of the noisy level of the channel based on Equation (3), $$CCA\_Freq = 1 - \frac{Rx\_MPDU\_Cnt}{Rx\_PPDU\_Cnt - Rx\_ACK\_Cnt} \quad (3)$$

where CCA_Freq is the norm of the noisy level of the channel, Rx_PPDU_Cnt is the third number, Rx_ACK_Cnt is the fourth number, and Rx_MPDU_Cnt is the fifth number.

The noisy level determination unit U13 may further include a second determination unit U135, configured to: if the difference between the third number and the fourth number is less than the second threshold, determine the norm of the noisy level of the channel to be zero.

The apparatus may further include a frequency threshold determination unit U14, configured to: determine the frequency threshold corresponding to the norm of the noisy level of the channel based on a first mapping relation.

The controlling unit U12 may include an increasing unit U121 and a decreasing unit U122.

The increasing unit U121 may be configured to: if the MPDU retransmission frequency is less than the frequency threshold, increase a PPDU transmission rate of a physical layer in the first terminal in a second period.

The decreasing unit U122 may be configured to: if the MPDU retransmission frequency is greater than or equal to the frequency threshold, decrease the PPDU transmission rate of the physical layer in the first terminal in the second period.

The controlling unit U12 may further include a remaining unit U123, configured to: if the PPDU transmission rate of the physical layer in the second period reaches a rate threshold, remaining the PPDU transmission rate of the physical layer in the second period.

The apparatus may further include a rate threshold determination unit U15 which is configured to determine the rate threshold.

The rate threshold determination unit U15 may include an average value unit U151 and a search unit U152.

The average value unit U151 may be configured to obtain an average value of first parameters received by the first terminal in the first period, where the first parameters are powers or signal strength indication values of the PPDUs received by the first terminal in the first period.

The search unit U152 may be configured to: obtain a rate corresponding to the average value according to a second mapping relation, and determine the rate as the rate threshold.

The second mapping relation may be determined based on a relation between sensitivity of a physical layer rate stipulated in the IEEE 802.11 standard and the first parameters.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for controlling a physical layer protocol data unit (PPDU) transmission rate of a physical layer in a first terminal, comprising:
   Obtaining a media access control protocol data unit (MPDU) retransmission frequency of the first terminal in a first period, where the first terminal is a station (STA) or an access point (AP) in a wireless network;
   if the MPDU retransmission frequency is less than a frequency threshold, increasing the PPDU transmission rate of the physical layer in the first terminal in a second period;
   if the MPDU retransmission frequency is greater than or equal to the frequency threshold, decreasing the PPDU transmission rate of the physical layer in the first terminal in the second period, where the second period is following and adjacent to the first period along a time axis; and
   transmitting PPDUs with the increased PPDU transmission rate or the decreased PPDU transmission rate in the second period.

2. The method according to claim 1, wherein obtaining the MPDU retransmission frequency comprises:
   obtaining a first number, where the first number represents the number of MPDUs transmitted by the first terminal in the first period;
   obtaining a second number, where the second number represents the number of MPDUs retransmitted by the first terminal in the first period;
   if the first number is greater than or equal to a first threshold, determining the MPDU retransmission frequency based on Equation (1), $$RR = \frac{Tx\_Retry\_Cnt}{Tx\_Total\_Cnt} \quad (1)$$

where RR represents the MPDU retransmission frequency, Tx_Total_Cnt represents the first number, and Tx_Retry_Cnt represents the second number; and
   if the first number is less than the first threshold, determining the retransmission frequency to be zero.

3. The method according to claim 1, wherein the frequency threshold increases with the increment of a noisy level of a channel.

4. The method according to claim 3, wherein the noisy level of the channel decreases with the increment of a first ratio, where the first ratio is obtained based on Equation (2), $$A = C/B \qquad (2)$$

where A represents the first ratio, B represents the number of a first set of data comprising all first data received by the first terminal in the first period, C represents a second set of data comprising a portion of the first data received by the first terminal in the first period, where each media access control (MAC) target address of the second set of data is the first terminal, where the first data comprise aggregation frames and non-aggregation frames.

5. The method according to claim 3, wherein the noisy level of the channel is determined based on a norm of the noisy level of the channel, and the norm of the noisy level of the channel is determined by:
- obtaining a third number, where the third number represents the number of PPDUs received by the first terminal in the first period;
- obtaining a fourth number, where the fourth number represents the number of Acknowledgement (ACK) frames or block ACK frames received by the first terminal in the first period;
- obtaining a fifth number, where the fifth number represents the number of the first data received by the first terminal in the first period, which are not ACK frames or block ACK frames and whose MAC target addresses are the first terminal; and
- if the difference between the third number and the fourth number is greater than or equal to a second threshold, determining the norm of the noisy level of the channel based on Equation (3), $$\text{CCA\_Freq} = 1 - \frac{\text{Rx\_MPDU\_Cnt}}{\text{Rx\_PPDU\_Cnt} - \text{Rx\_ACK\_Cnt}} \qquad (3)$$

where CCA_Freq represents the norm of the noisy level of the channel, Rx_PPDU_Cnt represents the third number, Rx_ACK_Cnt represents the fourth number, and Rx_MPDU_Cnt represents the fifth number.

6. The method according to claim 5, further comprising: if the difference between the third number and the fourth number is less than the second threshold, determining the norm of the noisy level of the channel to be zero.

7. The method according to claim 5, further comprising: determining the frequency threshold corresponding to the norm of the noisy level of the channel based on a first mapping relation.

8. The method according to claim 1, wherein increasing the PPDU transmission rate of the physical layer in the first terminal in the second period comprises: if the PPDU transmission rate of the physical layer in the second period reaches a rate threshold, remaining the PPDU transmission rate of the physical layer in the second period.

9. The method according to claim 8, wherein the rate threshold is related to first parameters, where the first parameters comprise powers or signal strength indication values of PPDUs received by the first terminal in the first period.

10. The method according to claim 9, wherein the rate threshold is obtained by:
- obtaining an average value of the first parameters received by the first terminal in the first period;
- obtaining a rate corresponding to the average value according to a second mapping relation; and
- determining the rate as the rate threshold, where the second mapping relation is determined based on a relation between sensitivity of a physical layer rate stipulated in the Institute of Electrical and Electronics Engineers (IEEE) 802.11 standard and the first parameters.

* * * * *